(12) United States Patent
Hara

(10) Patent No.: US 7,277,571 B2
(45) Date of Patent: Oct. 2, 2007

(54) EFFECTIVE IMAGE PROCESSING, APPARATUS AND METHOD IN VIRTUAL THREE-DIMENSIONAL SPACE

(75) Inventor: Fumiaki Hara, Tokyo (JP)

(73) Assignee: Sega Corporation, Tokyo (JP)

( * ) Notice: Subject to any disclaimer, the term of this patent is extended or adjusted under 35 U.S.C. 154(b) by 846 days.

(21) Appl. No.: 10/445,277

(22) Filed: May 20, 2003

(65) Prior Publication Data

US 2004/0021680 A1    Feb. 5, 2004

(30) Foreign Application Priority Data

May 21, 2002    (JP)    ............................. 2002-146583

(51) Int. Cl.
*G06K 9/00*    (2006.01)
*G09G 5/00*    (2006.01)
(52) U.S. Cl. ...................... 382/154; 345/633; 345/638
(58) Field of Classification Search ................ 382/154; 345/419, 420, 427, 632–634, 636, 638
See application file for complete search history.

(56) References Cited

U.S. PATENT DOCUMENTS 5,748,194 A * 5/1998 Chen .......................... 345/427
6,078,329 A * 6/2000 Umeki et al. ................ 345/419
6,400,364 B1 * 6/2002 Akisada et al. ............. 345/427
6,781,598 B1 * 8/2004 Yamamoto et al. ......... 345/629

FOREIGN PATENT DOCUMENTS

WO    95/35555    12/1995

* cited by examiner

*Primary Examiner*—Colin LaRose
(74) *Attorney, Agent, or Firm*—Ladas & Parry LLP

(57) ABSTRACT

It is an object of the present invention to make it possible to apply an effect, which does not cause deficiency in any direction of 360 degrees within a virtual three-dimensional space, around an object. An image processing method which generates an image obtained by viewing an object existing in a virtual three-dimensional space is provided which includes: a step of displaying a screen consisting of a three-dimensional model which contains the viewpoint and is provided between the viewpoint and the object; a step of displaying a predetermined image on the screen; and a step of generating an image obtained by viewing the object from the viewpoint through the screen

21 Claims, 19 Drawing Sheets

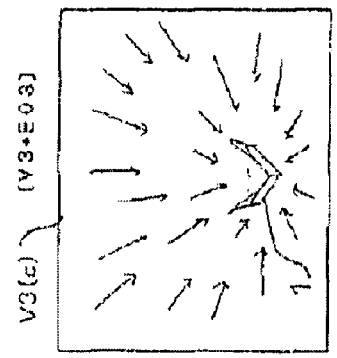
FIG. 7D (PRIOR ART)
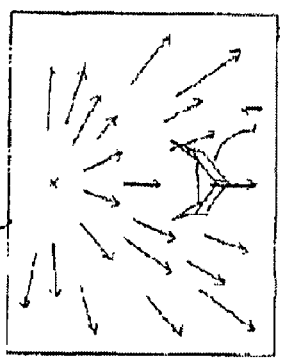
FIG. 7E (PRIOR ART)
FIG. 7F (PRIOR ART)
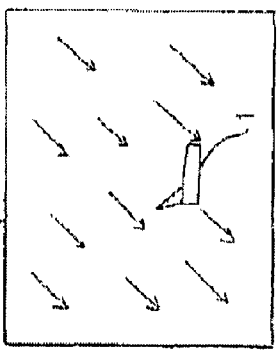
FIG. 7B (PRIOR ART)
FIG. 7C (PRIOR ART)
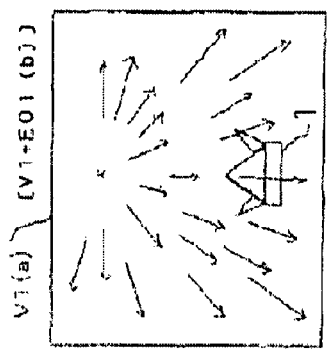
FIG. 7A (PRIOR ART)

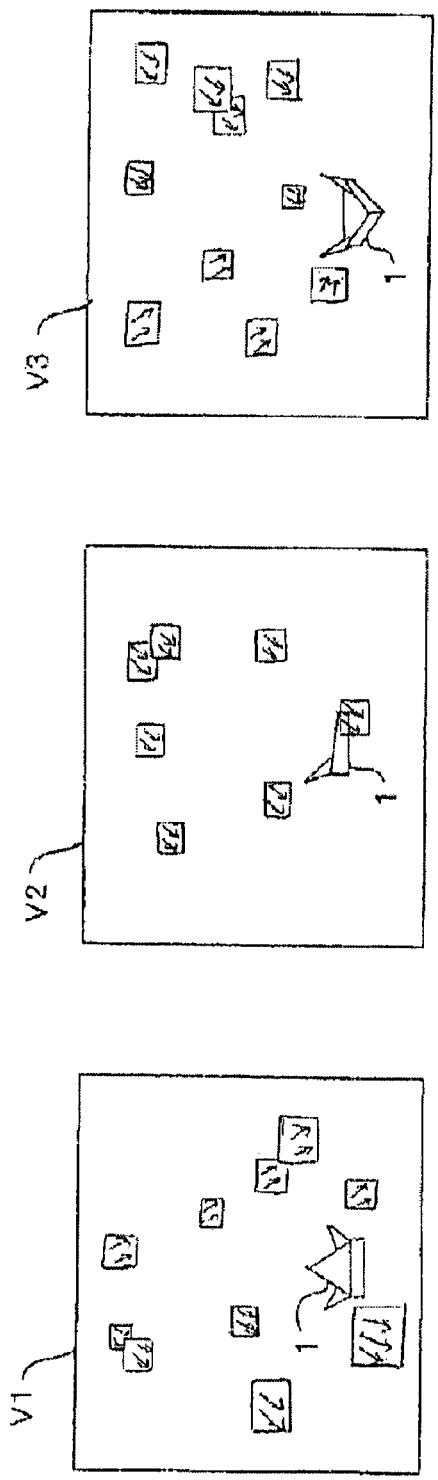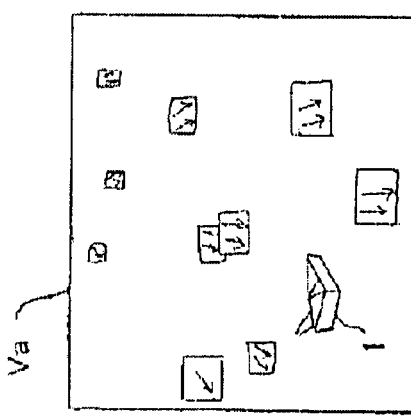
FIG.11A (PRIOR ART)
FIG.11B (PRIOR ART)
FIG.11C (PRIOR ART)
FIG.11D (PRIOR ART)

EFFECTIVE IMAGE PROCESSING, APPARATUS AND METHOD IN VIRTUAL THREE-DIMENSIONAL SPACE

BACKGROUND OF THE INVENTION

1. Field of the Invention

The present invention relates to an effect image processing method which generates an image obtained by viewing an object existing in a virtual three-dimensional space from a predetermined viewpoint in the virtual three-dimensional space, and in particular to an effect image processing method and apparatus for providing an effect processing around an object in a virtual three-dimensional space, and a program for the effect image processing method.

2. Description of the Related Art

In a game apparatus for realizing a computer game such as a so-called action game or role playing game, a hero/heroine (player character) in game pictures displayed on a screen of a display means is controlled and a story of the game is developed in response to an operation signal from an input means (controller pad) operated by a player. In particular, in recent years, following the improvement of a hardware performance, game pictures in which a player character moves in a virtual three-dimensional space are provided by three-dimensional graphics, whereby stage effects of the game is increased.

Three-dimensional graphics determines a relative spatial position of an object, which exists in a direction of a line of sight, from a viewpoint position in a virtual three-dimensional space based upon three-dimensional data representing the object and performs image processing such as rendering processing to represent the object three-dimensionally. That is, in a game utilizing the three-dimensional graphics, a player character and other objects viewed from the viewpoint position are represented three-dimensionally and the viewpoint or a line of sight is changed according to movement of a player or a game scene, whereby game pictures representing the virtual three-dimensional space are provided.

Incidentally, in a game frequently using the three-dimensional graphics such as an action game, an interest of the game often depends upon game pictures represented on a display in addition to a plot of the game. Therefore, in producing a game (game program), a type of game pictures provided to a player is a very important element. In a conventional game, game pictures representing a virtual three-dimensional space from a specific camera angle are provided. For example, game pictures are provided which look as if a player is photographing a character by pursuing the same, which is moving in response to operations of the player, from a virtual camera arranged in an upper rear position of the character. In addition, in the case in which an existing object other than a background in a distant place, for example, fog is represented, an effect image depicting a view of the object is synthesized with an image of the background in the distant place or the character, whereby various objects coming into a visual field of the virtual camera are represented, and the sense of reality is increased.

FIG. 1 schematically shows a method of displaying an effect image in a conventional game apparatus. For example, in the case in which an object existing between a viewpoint of a virtual camera 2 and a player character 1 in a visual field area of the virtual camera 2 is represented, a plane object 3 consisting of a rectangle two-dimensional model is provided as a polygon object for applying a texture image for an effective representation (fog, etc.) in front of the virtual camera 2, and an effect image (the texture image for the effective representation) is applied to the plane object 3 and synthesized with a main image of the player character 1 or the like to display the effect image. Alternatively, a technique is used which provides a large number of small plane objects 4, on which an image for the effective representation is projected, between the virtual camera 2 and the player character 1 as shown in FIG. 2 or arranges a plurality of plane objects 4 putting one behind another to display an effect image.

Here, the conventional image processing method for providing an effect processing around an object will be described more in detail with the case in which an effect processing for representing a pouring rain is provided to pictures, which are obtained by viewing an object 1 in a virtual three-dimensional space from respective viewpoints of virtual camera 2, as shown in FIGS. 3A to 3D as an example. Note that, in FIG. 3A, reference symbol V1 denotes an effect image on which the object 1 is viewed from an upper rear viewpoint; V2, an effect image on which it is viewed from a side viewpoint; V3, an effect image on which it is viewed from an upper front viewpoint; and V4, an effect image on which it is viewed from an upper viewpoint. In a three-dimensional coordinate system as shown in FIG. 3A, three-dimensional coordinates of the object 1 viewed from, for example, the upper, side, and upper front viewpoints are converted into a two-dimensional coordinate system by perspective conversion or the like and represented by shapes shown in FIGS. 3B, 3C, and 3D, respectively. FIGS. 4A, 4B, 4C, and 4D show display effect images of the object 1 and show images V1, V2, V3, and V4 of the object 1 viewed from the respective viewpoints of the virtual camera 2 in FIG. 3A, respectively. Such a conventional image processing method of providing an effect processing to images of an object in a virtual three-dimensional space (hereinafter referred to as an effect image processing method) will be hereinafter described.

FIG. 5 schematically shows a first embodiment of the conventional effect image processing method. In the case in which "rain" is displayed as an effect image by using the above-mentioned rectangle plane object 3 (see FIG. 1), as shown in FIG. 5, plane objects on which effect images E01(b), E02, E03, and E04 are applied are arranged in front of the virtual camera 2 for photographing the object 1 from respective viewpoints. FIGS. 6A to 6D show concrete examples of effect images. Effect image E01(a) of FIG. 6A shows a state in which, with a central part of the effect image as a generation point, rain is generated radially from the generation point. Effect image E01(b) of FIG. 6B shows a state in which, with an upper part in a center of the effect image as a generation point, rain is generated radially from the generation point. In addition, an effect image E02 of FIG. 6C shows a state in which rain is falling diagonally, and an effect image E03 of FIG. 6D shows a state in which, with a lower part in a center of the effect image as a disappearance point, rain disappears toward the disappearance point. In the first embodiment, the effect image E01(a), E01(b), E02, or E03 shown in FIGS. 6A to 6D is synthesized with respect to the images V1, V2, V3, or V4 shown in FIGS. 4A to 4D to display images as shown in FIGS. 7A to 7F. For example, an image plane V1(a) shown in FIG. 7A shows an image obtained by synthesizing the image V1 of FIG. 4A and the image E01(b) of FIG. 6B. In addition, with respect to the object 1 photographed by the virtual camera 2 arranged between V1 and V2 as shown in FIG. 5, images Va to which an effect processing is applied as shown in FIGS. 8A and 8B are displayed. In this way, in the first embodiment, a corresponding effect image (a texture image for an effective representation) is applied on a plane object consisting of a rectangle two-dimensional model provided in front of the virtual camera 2, the three-dimensional coordinate of the effect image are converted to a two-dimensional coordinate and the effect image after the coordinate conversion is synthesized with a main image so that the effect image of a moving object like rain is displayed. In the image processing for moving rain drops, for example, the texture images of rain drops are moved to predetermined directions by changing the texture images of rain drops in sequence (pattern changing), or by changing the mapping coordinate of the texture image of rain drops in sequence.

FIGS. 9A and 9B schematically show a second embodiment of the conventional effect image processing method. In the case in which "rain" is displayed as an effect image using the above-mentioned small plane objects 4 (see FIG. 2), as shown in FIG. 9A, small plane objects into which an effect image EF is applied as shown in FIG. 9B are arranged in front of the virtual camera 2 for photographing the object 1 from respective viewpoints. In this embodiment, a part of the effect images such as E01(a) or E02 shown in FIG. 6 is drawn for each effect image EF. In the case in which the virtual camera 2 is moved from a position of FIG. 10A to a position of FIG. 10B, the plane objects are rotated such that surfaces of the plane objects face a moving direction of the virtual camera 2 according to the movement of the virtual camera 2. In that case, the plane object of the effect image EF may be moved. In this second embodiment, with respect to the object 1 viewed from the viewpoints on the V1 side, the V2 side, the V3 side, and the Va side (between V1 and V2), a plurality of small plane objects to which effect images are applied as shown in FIGS. 11A to 11D is displayed. In this way, in the second embodiment, a large number of small plane objects rotation and movement of which can be controlled are provided in front of the virtual camera 2, and effect images and a main image are synthesized to display as a display image.

FIG. 12 schematically shows a third embodiment of the conventional effect image processing method. This embodiment is a method of moving the effect image EF as one drop of rain. In this third embodiment, with respect to the object 1 viewed from the viewpoints on the V1 side, the V2 side, the V3 side, and the Va side (between V1 and V2), the effect images EF for one drop of rain moved discretely in a moving direction of the drop of rain and a main image are synthesized to display a display image to which the effect processing is applied as shown in FIGS. 13A to 13D. In this way, in the third embodiment, drops of rain themselves are modeled and an image of each drop of rain and a main image are synthesized to display a display image.

SUMMARY OF THE INVENTION

However, as described above, the method of displaying an effect image using a plane object consisting of a rectangle two-dimensional model is effective in the case in which a direction of a virtual camera is not changed when existing objects other than a view in a distant place, for example, various natural objects existing around a player character are displayed as an effect image. However, there is a problem in that, in the case in which a direction of the virtual camera is changed, an effect image looks unnatural. For example, although there is no problem in the case of a uniform view such as fog, in the case in which an object having directionality such as rain (moving object moving to a predetermined direction) is displayed as an effect image, a direction of rain is different from an natural direction thereof by simply applying a texture image of the moving object to a plane object when the direction of the virtual camera is changed. Thus, as shown in FIGS. 7A to 7F and 8A and 8B, a consideration is required such as displaying various effect images of rain pouring in various directions and a main image in combination. In addition, even if a system for preparing an effect image as three-dimensional coordinate data and converting the three-dimensional coordinate data to synthesize it with a main image, a problem arises in that load of effect processing is heavy in representing the effect realistically, and the processing cannot be performed thoroughly by an inexpensive apparatus. In addition, in a form for displaying an effect image such as a moving object like rain by arranging small plane objects and rotating or moving the face of each plane object as in the above-mentioned second embodiment, a problem arises in that, for example, load of effective processing is heavy in eliminating unnaturalness, and the processing cannot be performed thoroughly by an inexpensive apparatus. Moreover, in a form for modeling drops themselves such as drops of rain to display an effect image as in the above-mentioned third embodiment, although movement becomes more natural, a problem arises in that, for example, load of drawing an image increases further and an apparatus with high performance is required.

The present invention has been devised in view of the above-mentioned circumstances, and it is an object of the present invention to provide an image processing method, apparatus and program which are capable of applying an effect image, which does not cause deficiency in any direction of 360 degrees within a virtual three-dimensional space when rain and the like is represented as an effect image of a moving object. In addition, it is another object of the present invention to provide an image processing method, apparatus and program which are capable of reducing load applied to effect processing and realizing the effect processing with an inexpensive apparatus.

The present invention relates to an image processing method which represents moving objects displayed around a character when said character is viewed from a predetermined viewpoint in the virtual three-dimensional space, and a program for the image processing method. The above-mentioned objects are attained by the image processing method which includes steps of: generating a main image including said character and a background image included in a visual field area viewed from the viewpoint of a virtual camera located in said virtual three-dimensional space; providing a spherical object at a position, the spherical object consisting of a three-dimensional model including the viewpoint of said virtual camera and applying a texture image of said moving objects on said spherical object functioning as a screen on which an effect image is applied; moving said texture image to a predetermined direction on said spherical object; generating a synthesized image of an effect image and said main image by changing said texture image to said effect image by converting a three-dimensional coordinate of said texture image to a two-dimensional coordinate in the visual field area on said spherical object viewed from the viewpoint of said virtual camera; and performing a moving process of the position of said spherical object according to movement of said virtual camera wherein the predetermined direction of said spherical object is invariable regardless of transition in a direction of said virtual camera.

Moreover, the above-mentioned objects are attained more effectively by the image processing method which includes a step of controlling the viewpoint of said virtual camera (viewpoint control means) such that the viewpoint moves around said character together with the screen said spherical object is further provided; the screen wherein said spherical object is a spherical object consisting of polygons including all visual field areas from the viewpoint of said virtual camera; wherein said spherical object is provided in a plural form and the plurality of spherical objects are disposed so as to form layered spherical objects; wherein, in said step of performing the applying process of said texture image, said texture image in which any one of a display content, a direction, a color, and a speed of said moving objects is different is applied on each of said plural spherical objects; and a step of controlling at last one of said character, the viewpoint of said virtual camera, and a direction of the view so as to move according to an operational input of an operator (movement control means), and a step of changing the shape and/or size of said spherical object moving according to the move of said virtual camera by the coordinate conversion of said spherical object or by the change of said spherical object to another spherical object are further provided.

The above-mentioned objects are attained by the image processing apparatus which includes means of: generating a main image including said character and a background image included in a visual field area viewed from the viewpoint of a virtual camera located in said virtual three-dimensional space; providing a spherical object at a location, the spherical object consisting of a three-dimensional model including the viewpoint of said virtual camera and applying a texture image of said moving objects on said spherical object functioning as a screen on which an effect image is applied; moving said texture image to a predetermined direction on said spherical object; generating a synthesized image of an effect image and said main image by changing said texture image to said effect image by converting a three-dimensional coordinate of said texture image to a two-dimensional coordinate in the visual field area on said spherical object viewed from the viewpoint of said virtual camera; and performing a moving process of the position of said spherical object according to movement of said virtual camera wherein the predetermined direction of said spherical object is invariable regardless of transition in a direction of said virtual camera.

In addition, the above-mentioned objects are also attained more effectively by the image processing apparatus, in which a viewpoint control means which controls the viewpoint such that the viewpoint moves around said character together with said object is further provided; wherein said object is a spherical object consisting of polygons including all visual field areas from the viewpoint of said virtual camera; wherein said spherical object is provided in a plural form and the plurality of spherical objects are disposed so as to form layered spherical objects; wherein, in said means for applying said texture image, said texture image in which any one of a display content, a direction, a color, and a speed of said moving objects is different is applied on each of said plural spherical objects; a movement control means which controls at least one of said character, the viewpoint of said virtual camera, and a direction of the view so as to move according to an operational input of an operator is further provided; and a means of changing the shape and/or size of said spherical object moving according to the move of said virtual camera by the coordinate conversion of said spherical object or by the change of said spherical object to another spherical object is further provided.

Further, the program is a computer program embodied in a computer readable medium for processing an effect image representing moving objects displayed around a character when said character is viewed from a predetermined viewpoint in the virtual three-dimensional space. The above-mentioned objects are attained by the computer program embodied in a computer readable medium which includes steps of: generating a main image including said character and a background image included in a visual field area viewed from the viewpoint of a virtual camera located in said virtual three-dimensional space; providing a spherical object at a location, the spherical object consisting of a three-dimensional model including the viewpoint of said virtual camera and applying a texture image of said moving objects on said spherical object for applying an effect image; moving said texture image to a predetermined direction on said spherical object; generating a synthesized image of an effect image and said main image by changing said texture image to said effect image by converting a three-dimensional coordinate of said texture image to a two-dimensional coordinate in the visual field area on said spherical object viewed from the viewpoint of said virtual camera; and performing a moving process of the position of said spherical object according to movement of said virtual camera wherein the predetermined direction of said spherical object is invariable regardless of transition in a direction of said virtual camera. Moreover, the above-mentioned objects are attained more effectively by the computer program embodied in a computer readable medium which further includes steps of: controlling the viewpoint of said virtual camera so as to move around said character together with said spherical object; and controlling at least any one of said character, the viewpoint of said virtual camera, and a direction of the view so as to move according to an operational input of an operator.

BRIEF DESCRIPTION OF THE DRAWINGS

FIGS. 7A to 7F are first diagrams showing examples of a synthesized image in the first embodiment of the related art;

FIGS. 11A to 11D are diagrams showing examples of a synthesized image in the second embodiment of the related art;

DESCRIPTION OF THE PREFERRED EMBODIMENT

An embodiment of the present invention will be hereinafter described in detail with reference to the accompanying drawings. Here, the case in which the present invention is applied to a computer game will be described as an example. The computer game includes a game of a form in which the game is advanced as a predetermined displayed object (hereinafter referred to as player character) operating in response to an operational input of an operator (hereinafter referred to as player) moves forward while moving in a virtual three-dimensional space, following the preset course, or moving in a free space.

Figure 1:
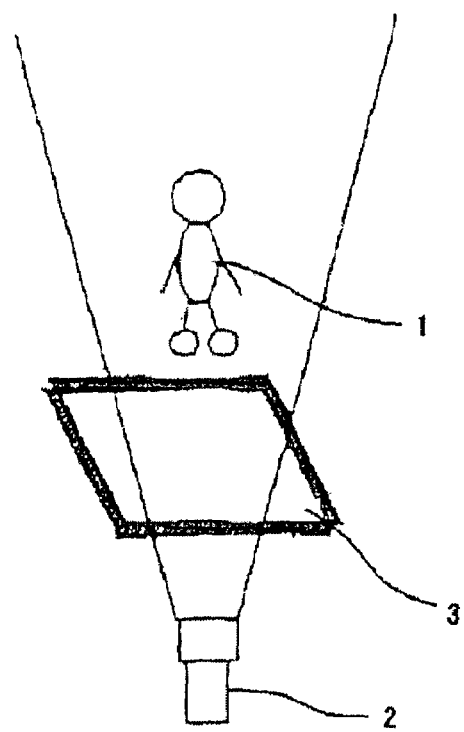
FIG. 1 is a diagram schematically showing a first embodiment of a display method for an effect image in a conventional game apparatus.
Figure 2:
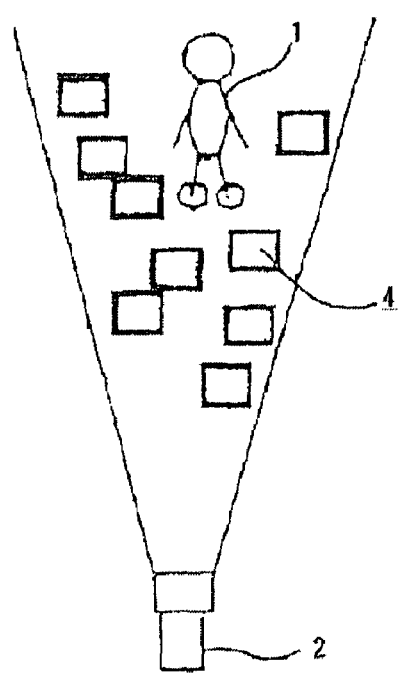
FIG. 2 is a diagram schematically showing a second embodiment of the display method for an effect image in the conventional game apparatus.
Figure 3A:
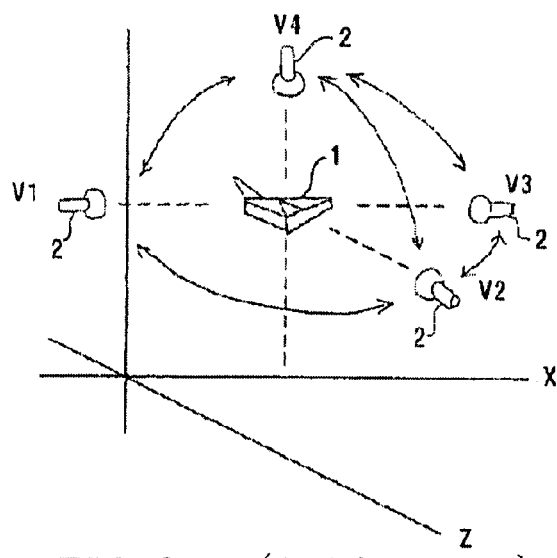
FIGS. 3A and 3D are diagrams showing a specific example of an object to which an effect is applied.
Figure 3B:
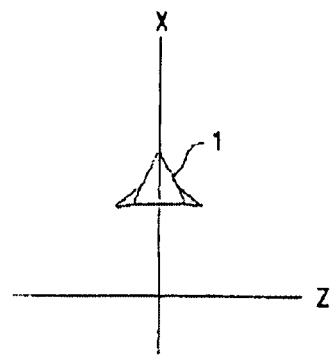
Figure 3C:
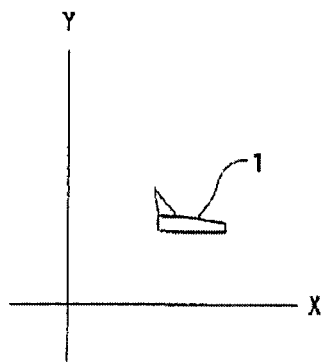
Figure 3D:
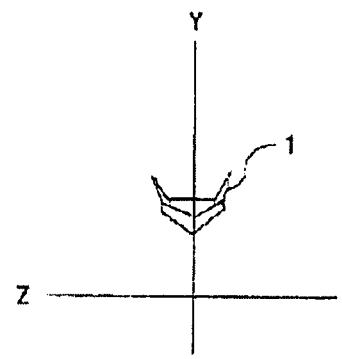
Figure 4A:
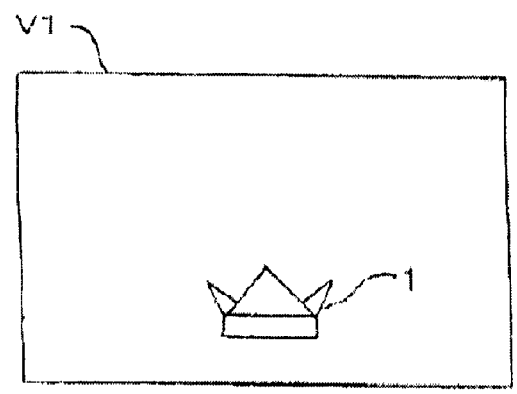
FIGS. 4A and 4D are diagrams showing examples of a screen an object of the objects of FIGS. 3A to 3D.
Figure 4B:
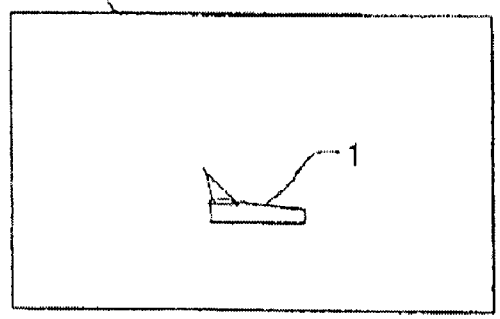
Figure 4C:
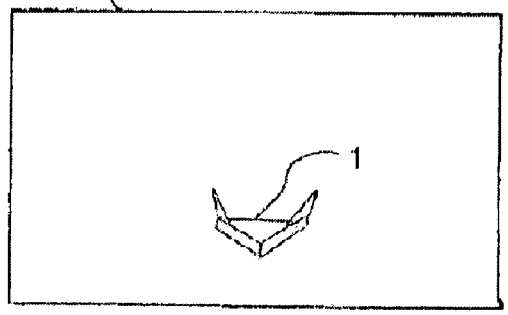
Figure 4D:
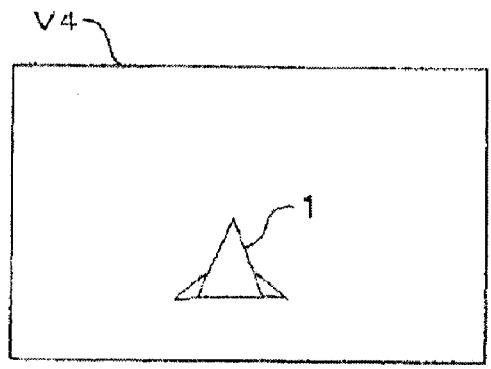
Figure 5:
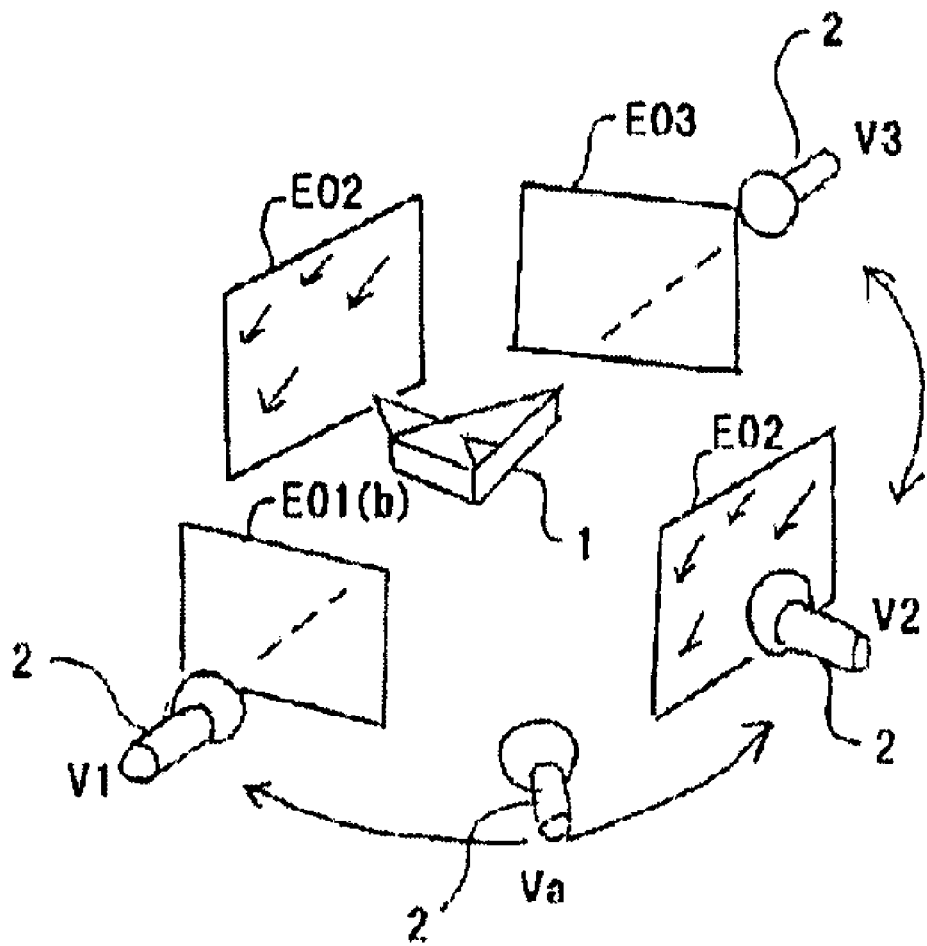
FIG. 5 is a schematic diagram for explaining the first embodiment of the related art.
Figure 6D:
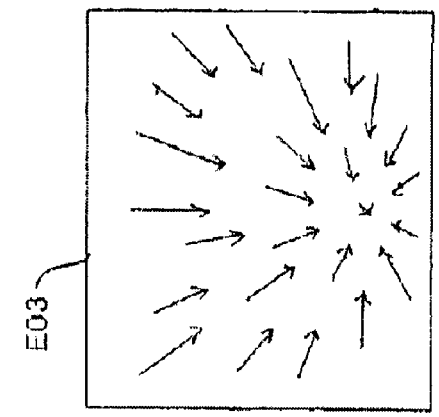
FIGS. 6A to 6D are diagrams showing examples of an effect image in the first embodiment of the related art.
Figure 6C:
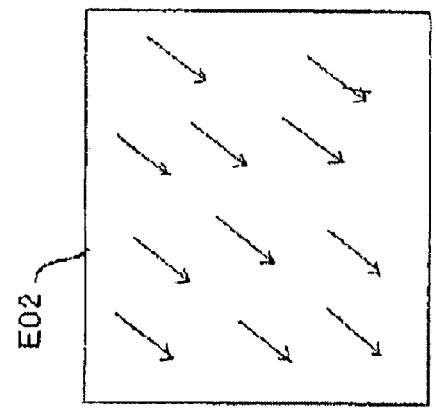
Figure 6A:
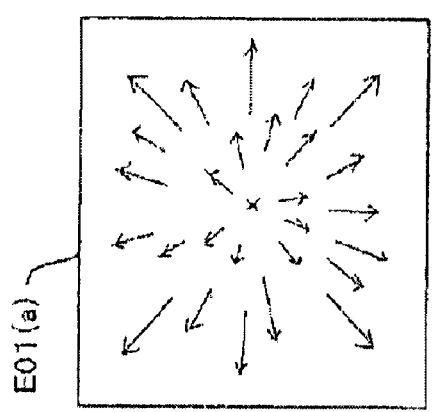
Figure 6B:
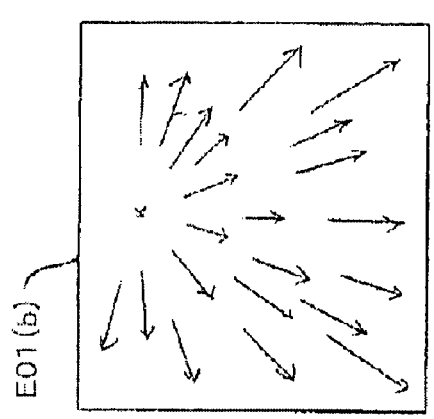
Figure 8A:
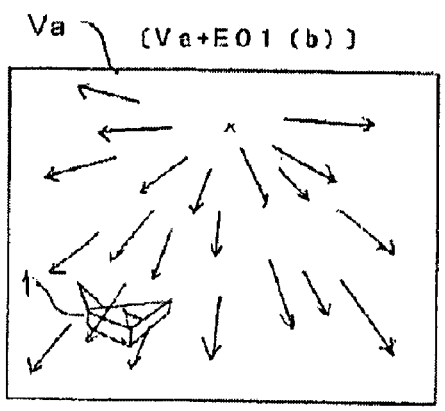
FIGS. 8A and 8B are second diagrams showing examples of a synthesized image in the first embodiment of the related art.
Figure 8B:
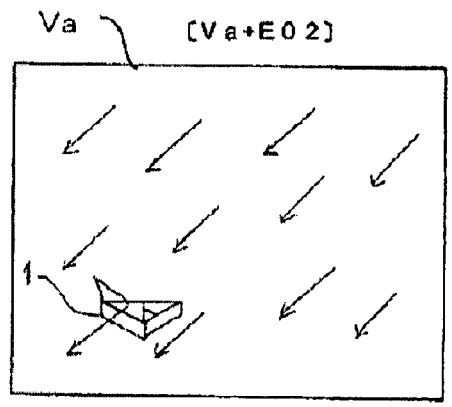
Figure 9A:
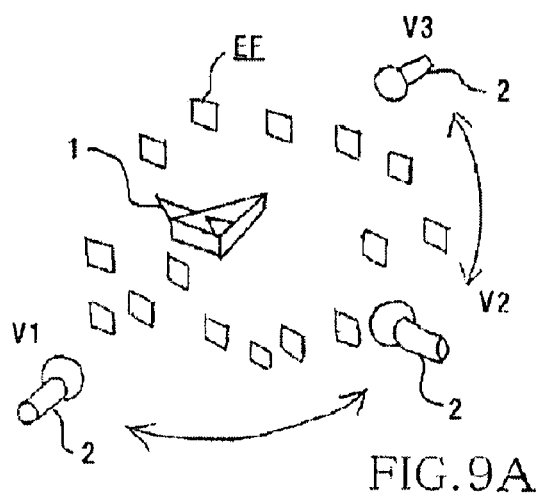
FIGS. 9A and 9B are schematic diagrams for explaining a second embodiment of the related art.
Figure 9B:
Figure 10A:
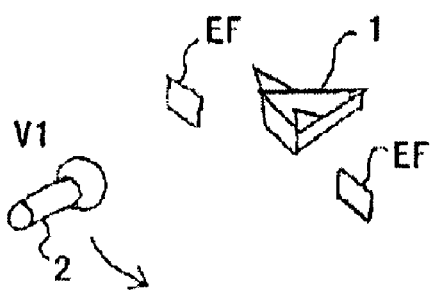
FIGS. 10A and 10B are diagrams for explaining an effect display control method in the second embodiment of the related art.
Figure 10B:
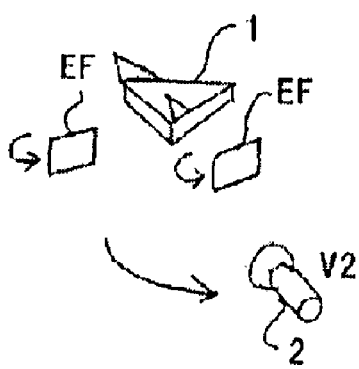
Figure 12:
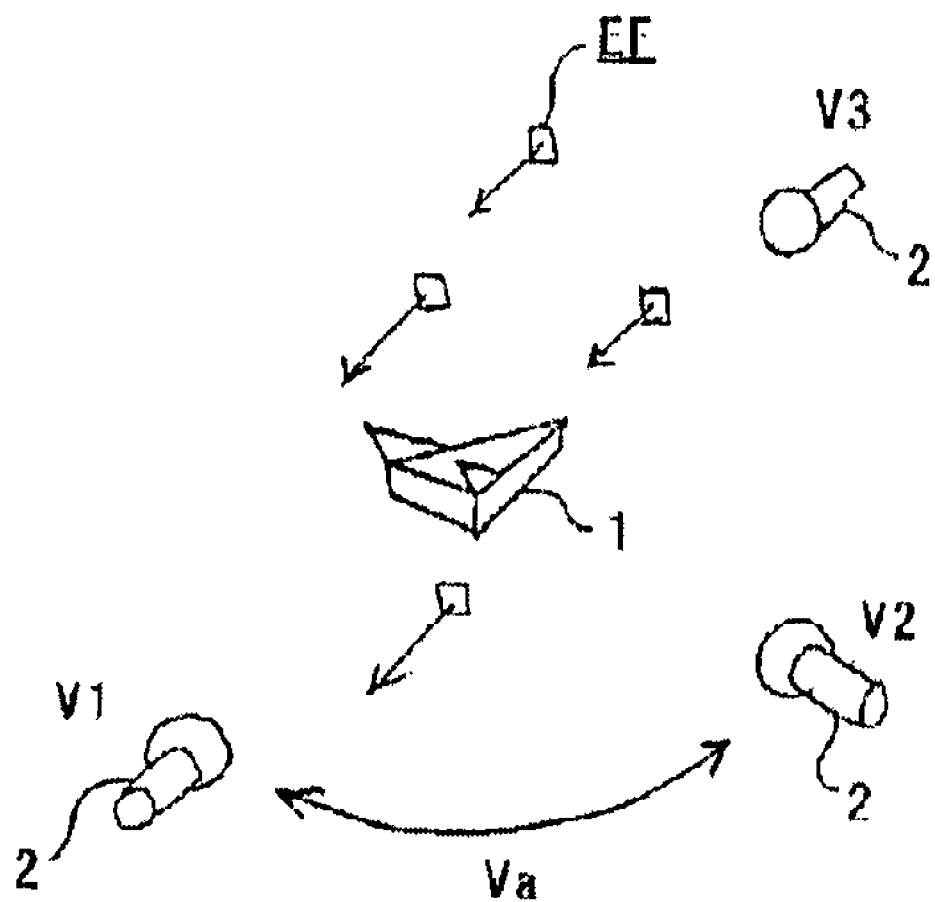
FIG. 12 is a schematic diagram for explaining a third embodiment of the related art.
Figure 13D:
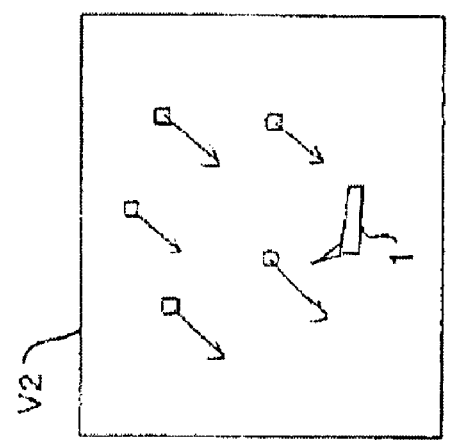
FIGS. 13A to 13D are diagrams showing examples of a synthesized image in the third embodiment of the related art.
Figure 13C:
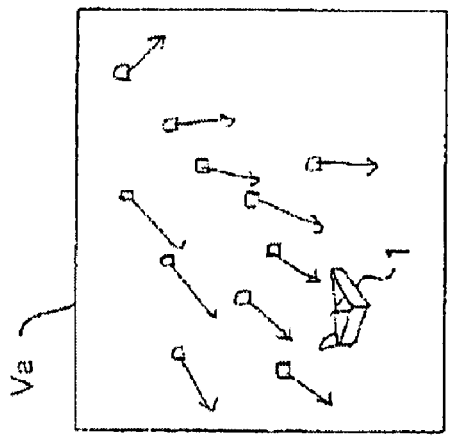
Figure 13A:
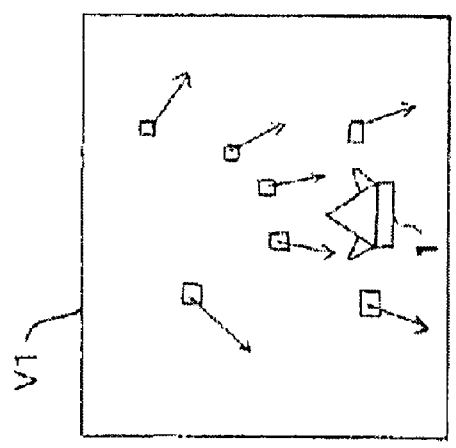
Figure 13B:
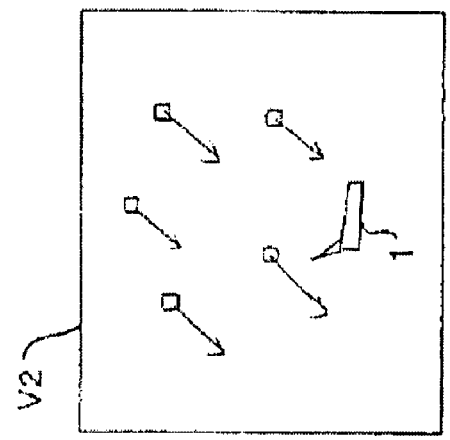
Figure 14:
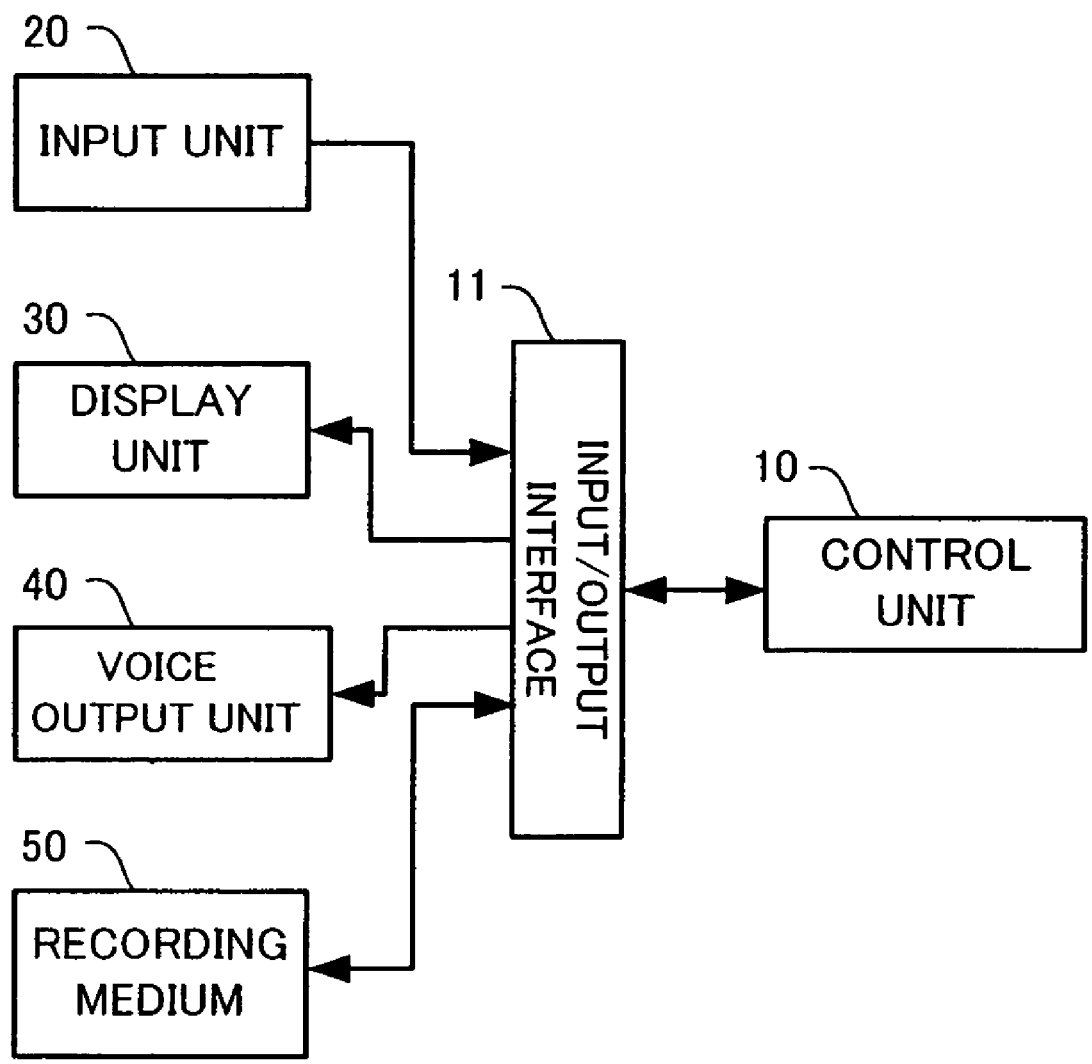
FIG. 14 is a block diagram showing an example of a structure of an image processing apparatus realizing the present invention.

An apparatus realizing an image processing method for applying an effect in accordance with the present invention only has to be an information processing apparatus which is capable of controlling execution of a computer program such as a game apparatus for home use, a personal computer, a cellular phone, or a game apparatus for business use (arcade game machine). As a hardware configuration, a general-purpose hardware can be applied to the apparatus. FIG. 14 shows, in the form of a block diagram, an example of a structure of the information processing apparatus (hereinafter referred to as game apparatus) realizing the present invention. The game apparatus in accordance with the present invention includes: a control unit 10 which performs execution control of a computer program, control for input to and output from peripheral equipment via an input/output interface 11, and the like; an input unit 20 which inputs operation information or the like of a player; a display unit 30 for displaying an image; a voice output unit 40 which outputs sound effects or voices; and a recording medium 50 which records an application program, data, or the like. In terms of hardware, the control unit 10 includes a control means such as a CPU or an MPU, the operation information input unit 20 includes an input means such as a control pad, a joy stick, or a keyboard, the display unit 30 includes a display means such as a liquid crystal display or a CRT, and the voice output unit 40 includes a sound output means such as a speaker. In the present invention, a type and the number of hardware are not limited to these.

In addition, the recording medium 50 is an information storage medium in which an image processing program and data in accordance with the present invention are stored, and a type and a place where there is the recording medium 50 are not limited as long as control for input to and output from it can be performed by a CPU. For example, a program recorded in a recording medium of a server on a network and a program on a game apparatus side are caused to cooperate to perform processing for computer graphics. Alternatively, a program may be read out from a predetermined recording medium (flexible disk, hard disk, CD-ROM, CD-R, DVD-ROM, DVD-RAM, DVD-R, PD disk, MD disk, MO disk, etc.) on the game apparatus side and processed on the game apparatus side independently. Here, the latter will be described as an example.

An image processing function in accordance with the present invention is realized by a computer program (hereinafter referred to as program) executed by a CPU, and the program is recorded in the predetermined recording medium 50 on the game apparatus side described above. Note that a form of realizing a part of the image processing function with hardware is also included in the present invention.

Figure 15:
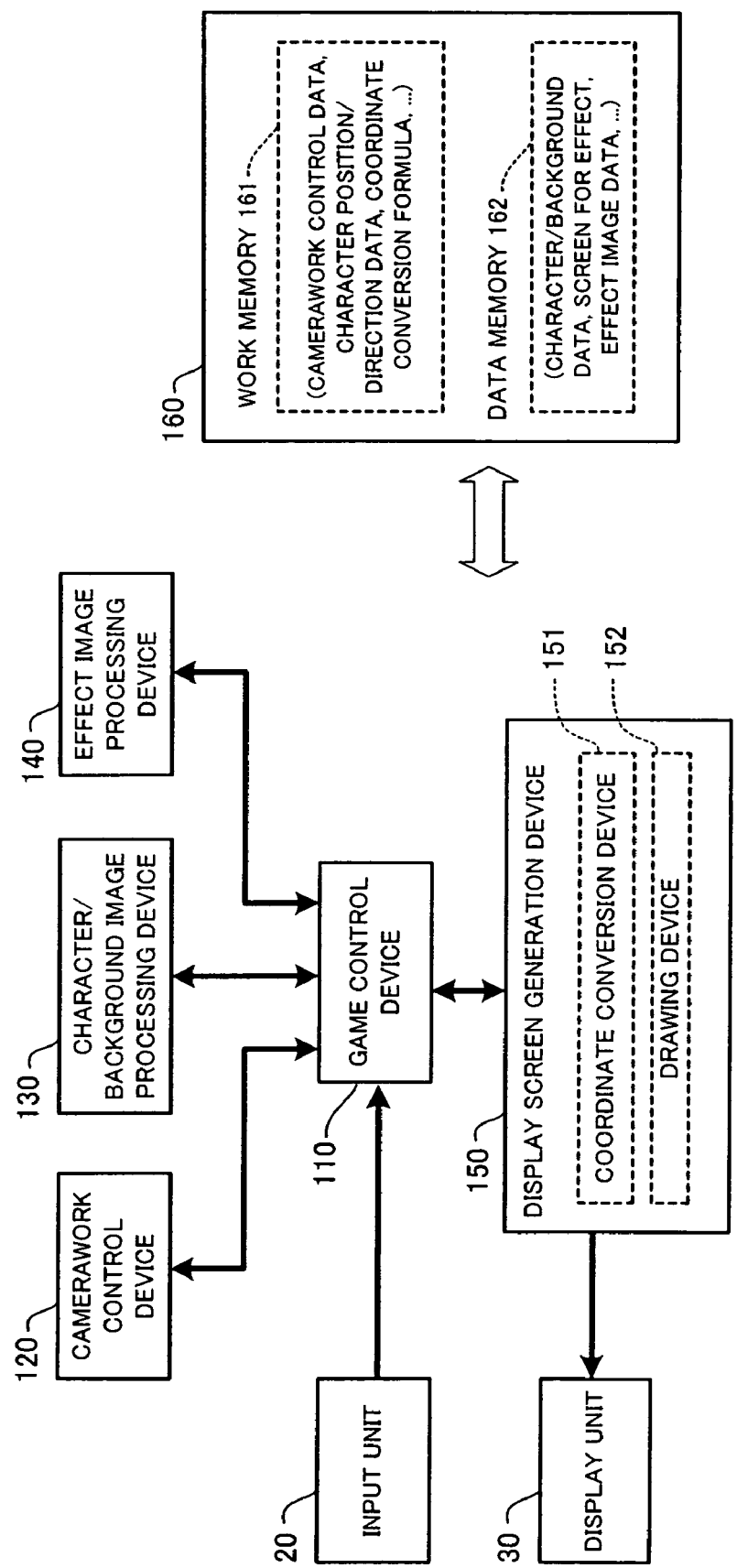
FIG. 15 is a block diagram showing an example of a structure of a main part of software realizing an image processing function in accordance with the present invention.

FIG. 15 shows, in a form of a block diagram, an example of a structure of a main part of software realizing the image processing function in accordance with the present invention. As main components, the control unit 10 includes: a game control means 110 which controls operations of the entire game; a camerawork control means 120 which control camerawork of a virtual camera photographing a displayed object in a virtual three-dimensional space; a character/background image processing means 130 which performs processing for a main image such as movement of a character in a virtual three-dimensional space and a background; an effect image processing means 140 which performs processing for an effect image by using a three-dimensional model objects for effect described hereinafter) covering the virtual camera; and a display image generation means 150 which generates a display image of a virtual three-dimensional image consisting of the main image and the effect image. The display screen generation means 150 is provided with a coordinate conversion processing means 151 and a drawing means 152. In this embodiment, display data for two-dimensional screen is generated from a three-dimensional model represented by a plurality of polygons.

A storage means 160 includes a work memory 161 and a data memory 162 and has data for execution of an application program stored therein. In the data memory 162, information on a player character, a background, and a fixed displayed object in a virtual three-dimensional space is stored as information by a unit of polygon surface. Moreover, an object for effect, various effect image data to be projected on the object, and the like are stored in the data memory 162. On the other hand, in the work memory 161, a coordinate conversion formula or the like for converting camerawork control data (parameters for camerawork of a virtual camera), position and direction data of each character including a player character, and polygon data on three-dimensional world coordinates into polygon data on two-dimensional screen coordinates is stored.

The coordinate conversion processing means 151 serving as a component of the display image generation means 150 reads out the information on a moving body such as a player character, a background, and the like (in this embodiment, polygon data of a three-dimensional model represented by a plurality of polygons) and the coordinate conversion formula relating to the information from the data memory 162 to perform coordinate conversion processing of the polygon data and, further performs coordinate conversion processing for projecting the converted polygon data on three-dimensional coordinates on an object. The drawing means 152 writes the polygon data in a memory for image output such as a graphic memory and, upon finishing writing all the polygon data, reads out the polygon data, synthesizes main image data consisting of the back ground, the player character, and the like, and effect image data if necessary, and outputs the synthesized image data to the display unit 30.

Here, information processing of the virtual three-dimensional space in accordance with the present invention will be described. Three-dimensional information is retained as picture information for showing an image on the display unit 30. That is, all positions and shapes of displayed objects relating to the picture to be shown are specified by coordinates in a three-dimensional coordinate space.

In addition, a viewpoint (virtual viewpoint) is set in an arbitrary position in the virtual three-dimensional space, and a picture to be shown on the display unit 30 is assumed to be a sight obtained by projecting the inside of the space from the viewpoint. Here, "projecting" means viewing the virtual three-dimensional space from a virtual camera, and projection processing is performed based upon various parameters such as a viewpoint position, an azimuth angle, and a visual field area of the virtual camera. The viewpoint of the virtual camera can be set in an arbitrary position in the space. Then, the viewpoint is continuously moved every moment, whereby pictures to be shown on the display unit 30 also changes gradually. A person gazing at the display unit 30 feels as if the person himself/herself is moving in the virtual three-dimensional space. Moreover, information on a light source can be incorporated into the virtual three-dimensional space. When a position of the light source is specified, a shadow of the displayed object in the space is specified based on its information.

As the camerawork of the virtual camera, for example, the virtual three-dimensional space is projected from an arbitrary position such as a position of a predetermined distance apart from a moving body (here, player character) to be pursued or a position of the player character such that the virtual camera pursues the moving body moving in response to operations of a player. Parameters for the camerawork of the virtual camera, for example, a pursued object, movement of the virtual camera, a position of the virtual camera, an azimuth angle, and a distance between the player character and the virtual camera (zoom-up and zoom-out) are automatically changed according to a position of the player character in the virtual three-dimensional space or a scene of a game and are also changed according to an operation of the player. For example, the parameters are automatically changed according to a state of progress of a game. In addition, a direction or a position of the virtual camera is changed according to a direction or a position of the player character operating in response to an operation of the player character or according to an operation relating to angles of vision in all directions including left, right, up, and down. According to which of the above conditions the parameters are changed is determined by a position of the player character and a scene of the game as elements.

Incidentally, there are several techniques for representing a displayed object in a virtual three-dimensional space. Two typical techniques among them are polygon processing and patch processing. The polygon processing is a technique for establishing a three-dimensional figure with a plurality of polygons. That is, it is a technique for, considering that a displayed object is an aggregate of a plurality of polygon plates, storing information by the unit of the polygon. On the other hand, the patch processing is a technique for establishing a three-dimensional figure with a plurality of curved surfaces. According to this technique, although it is possible to form a three-dimensional figure consisting of smooth curved surfaces easily, there is a disadvantage that arithmetic operation time is longer compared with the polygon processing. Whichever technique may be used for the object for effect in accordance with the present invention. In this embodiment, the player character and the background are represented three-dimensionally by the polygon processing.

Here, image processing utilizing polygons will be described as an example. Components relating to virtual three-dimensional display will be described in detail. The coordinate conversion processing means 151 reads out, for example, information on a fixed displayed object relating to the background stored in the data memory 162 and the position of a player character, the position of a viewpoint, and the coordinate conversion formula relating to the positions stored in the work memory 161. Then, the coordinate conversion processing means 151 performs coordinate conversion processing for subjecting the information of the fixed displayed object such as the background to coordinate conversion on the basis of a relative viewpoint of the virtual camera with respect to the player character at that point and projecting polygon data on the converted three-dimensional coordinates on the screen. Information obtained as a result of this processing is sent to the drawing unit 113, whereby image data is generated with transparency, luminance, color, and the like as parameters and, consequently, a three-dimensional picture is shown on the display unit 30.

An image processing method for applying an effect around an object (displayed object) in a virtual three-dimensional space viewed from a virtual camera (viewpoint) in the structure described above will be described. In the present invention, effect display can be performed which does not cause deficiency in a picture in any direction of 360 degrees within the virtual three-dimensional space around the viewpoint of the virtual camera having a function of pursuing an object such as a player character.

Figure 16:
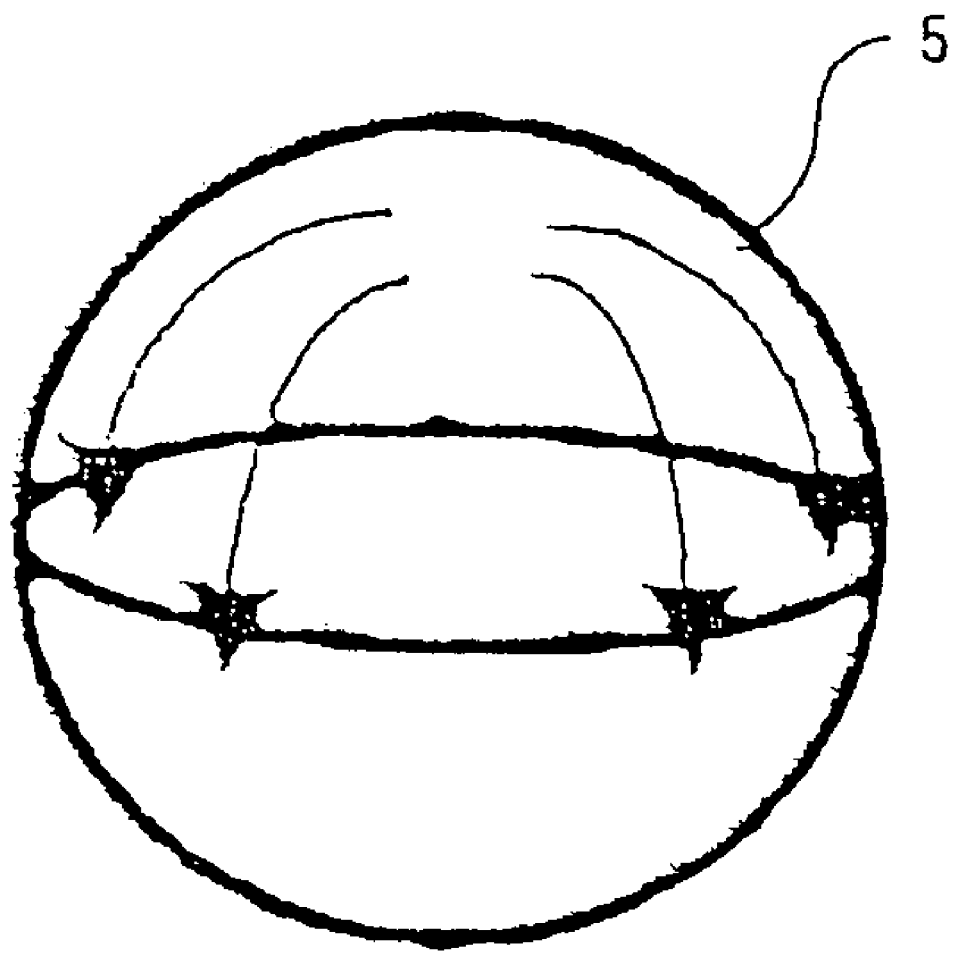
FIG. 16 is a perspective view schematically showing an example of a three-dimensional model used as an object for effect in accordance with the present invention.

FIG. 16 shows an example of a three-dimensional model used as an object for effect. In the present invention, for example, a spherical three-dimensional model 5 surrounding (containing) a virtual camera is prepared as the object for effect (an object for applying an effect image), a texture image for effect display is applied (drawn) in series according to movement of a moving object such as rain, etc. onto a surface of the three-dimensional model 5, and a three-dimensional image of the effect converted into a two-dimensional image is used as an effect image. The three-dimensional model 5 consists of, for example, the number of vertexes and vertex data (coordinate data at each vertex in an XYZ coordinate system). Parameters (a material, texture coordinates for giving the feel of a material or the like, transparency, luminance, color, normal vector, etc.) incidental to this three-dimensional model are operated to represent the feeling of air, a fluid having directionality such as rain or wind, whereby various image effects can be given. Such an object for effect consisting of the three-dimensional model covering the virtual camera is arranged so as to form a plurality of objects around the viewpoint of the virtual camera, effects are applied using a plurality of objects for effect, and the effects are displayed one on top of another, whereby an effect image having increased depth perception can be displayed.

Figure 17:
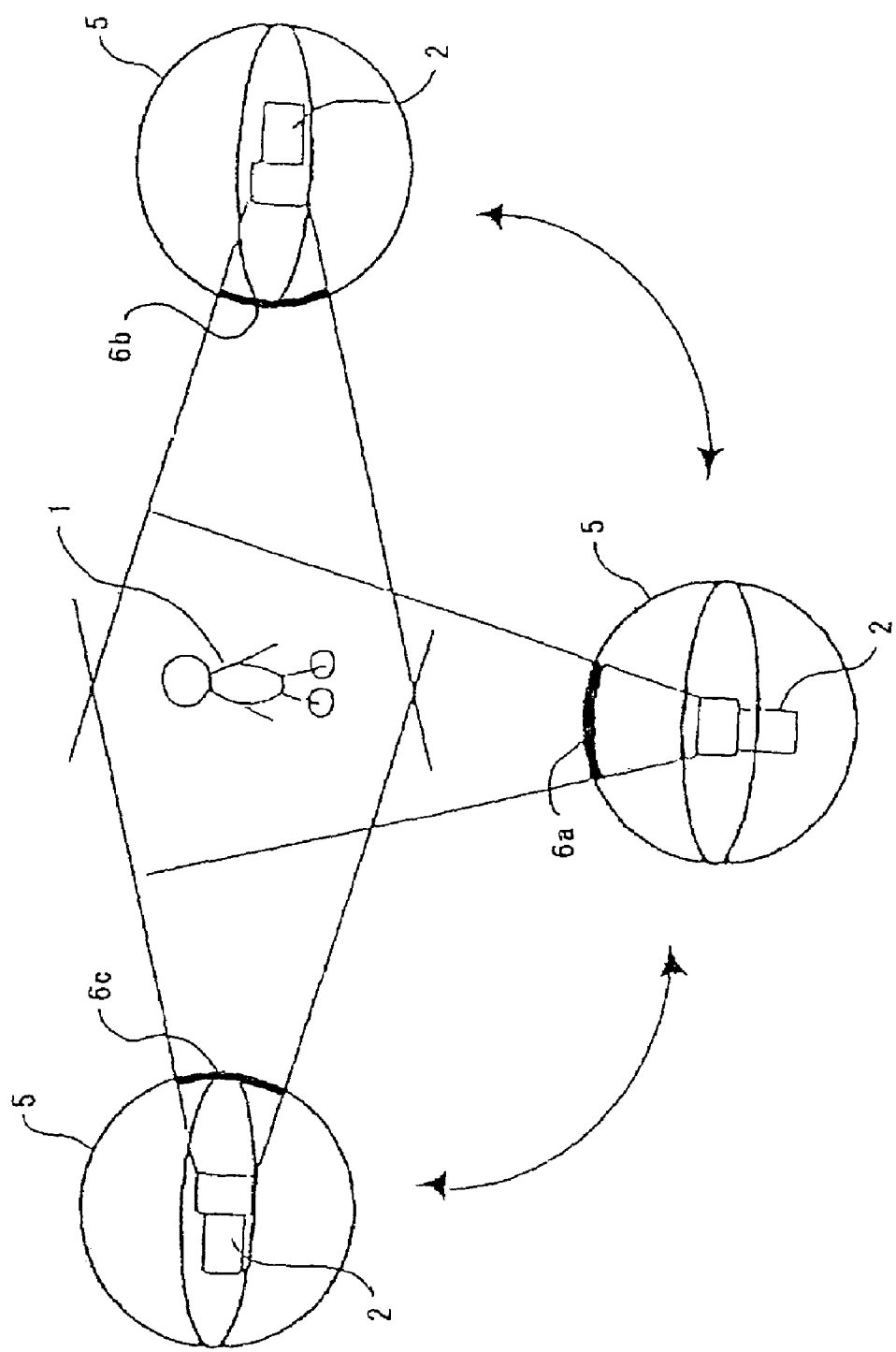
FIG. 17 is a schematic diagram showing a positional relation between the object for effect in accordance with the present invention and a player character and a relation between a direction of a virtual camera and a direction of the object for effect.

FIG. 17 shows a positional relation between an object for effect and a player character and a relation between a direction of a virtual camera and a direction of the object for effect. As shown in FIG. 17, assuming that a viewpoint position (projection center position) in a virtual three-dimensional space at the time when an object is represented three-dimensionally is a viewpoint position of the virtual camera 2, the object for effect 5 is provided between the viewing position of the virtual camera 2 and the player character 1 as a displayed object so as to cover the virtual camera 2. Then, a position of the object for effect 5 is moved according to movement of the virtual camera 5. A direction of the object for effect 5 is always fixed in a three-dimensional coordinate space and does not change even if a direction of the virtual camera 5 changes. Therefore, it is unnecessary to change movement of an effect. That is, rather than a conventional plane surface object consisting of the two-dimensional model, the object for effect 5 consisting of the three-dimensional model covering the virtual camera 2 is provided, an effect image is drawn on the object for effect 5, and an effect image corresponding to an image pickup area (visual field area) of the virtual camera 2 is synthesized with a background in a distant place and a main image such as a player character and displayed, whereby effect display which does not cause deficiency in any direction of 360 degrees within the virtual three-dimensional space can be performed.

In an example of FIG. 17, the player character 1 is a moving object which moves in the virtual three-dimensional space in response to operational input of a player. In addition, the object for effect 5 is always located in a position of the virtual camera 2 which is moved following a change of camerawork according to movement of the player character 1 or a change of a scene. An effect image at a pertinent camera angle is an image 6a, 6b, and 6c obtained by carving out and extracting an effect image corresponding to a visual field area at the camera angle (or an image obtained by removing a part of the effect image outside the area by clipping processing or the like and extracting the remaining part) within images on the object for effect 5. It is preferable that the object for effect 5 is a spherical three-dimensional model like a sphere in the case in which a natural object such as a fluid existing substantially uniformly like rain or snow is used as an effect image. However, a shape of the three-dimensional model is not limited to spherical, and an arbitrary three-dimensional shape such as polyhedron, triangular pyramid, or cylindrical can be applied. In addition, the object for effect may be any object as long as it is a virtual three-dimensional model containing all visual field areas from a viewpoint, and may be an object having an opening. Further, a shape of the object for effect 5 may be changed according to a scene or an operation of a player by a technique or the like for changing it using a cluster or a shape or by switching to an object of a pertinent shape.

In this embodiment, in order to make the processing described above possible, the effect image processing means 140 includes steps of: providing a spherical object consisting of a three-dimensional model including the viewpoint of said virtual camera; applying a texture image of said moving objects on said spherical object functioning as a screen on which an effective image is applied and processing the movement of the texture image; controlling the viewpoint so as to move around the object such as the player character together with the object for effect; and extracting an area on the object for effect, which corresponds to a visual field area at a pertinent camera angle of the virtual camera, as an image area to which the effect is applied. Moreover, the effect image processing means 140 includes steps of: using layered objects for effect with different sizes provided as the object for effect; changing a shape and a size of the object for effect or one of them according to an object or an operation of a player by coordinate conversion or switching of an object; and manipulating parameters representing a material, feel of a material, color, transparency, and the like incidental to the object for effect.

On the other hand, the display screen generation means 150 includes a step of generating an image obtained by viewing an object from a viewpoint through the object for effect. More specifically, the display screen generation means 150 includes a step of converting an effect image (three-dimensional) of the extracted visual field area into a two-dimensional image and a step of synthesizing the converted image with a main image as an effect image. The related art can be utilized for these steps of the display screen generation means 150, and the steps can be realized without using special hardware or dedicated software. Note that the conversion of the three-dimensional effect image into the two-dimensional image may be carried out in advance to extract the two-dimensional image according to a camera angle instead of being carried out on a real time basis.

Figure 18:
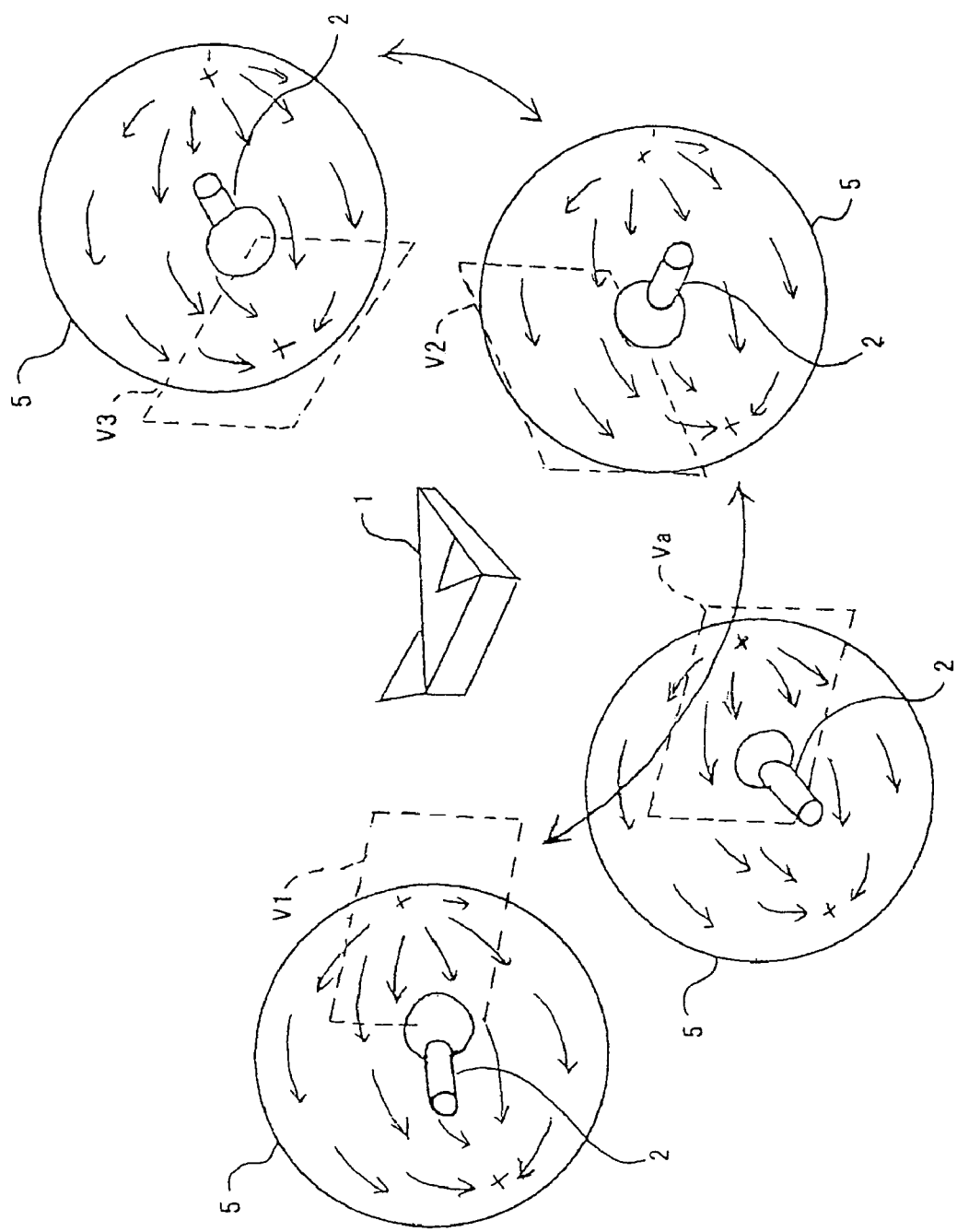
FIG. 18 is a schematic diagram for explaining a specific example of effect processing in the present invention in association with the related art.
Figure 19D:
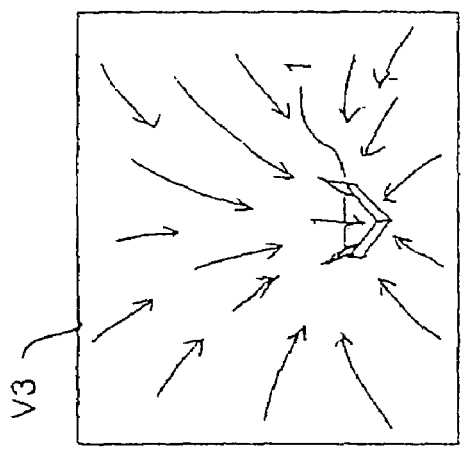
FIGS. 19A and 19D are diagrams showing specific examples of an image to which the effect processing in the present invention is applied.
Figure 19C:
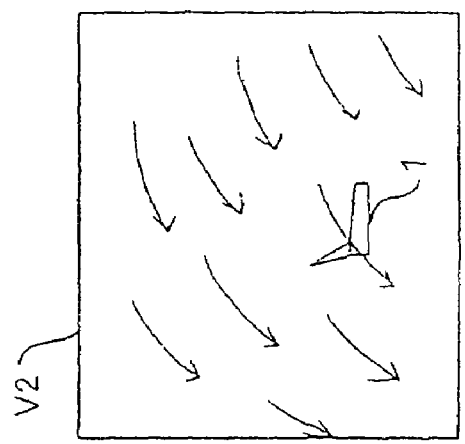
Figure 19A:
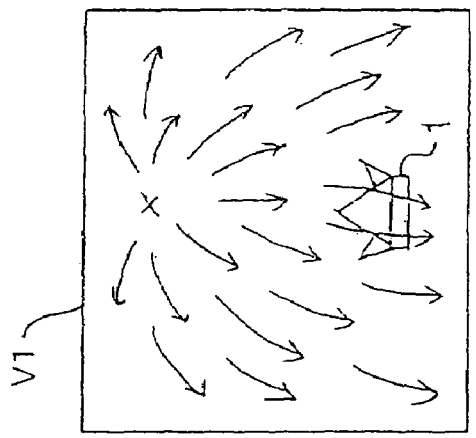
Figure 19B:
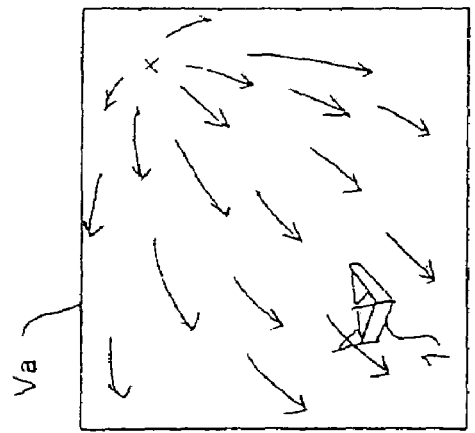

Here, the case in which effect processing for representing a pouring rain is applied to pictures obtained by viewing the object 1 in the virtual three-dimensional space from the respective viewpoints of the virtual camera 2 as shown in FIG. 3 will be described as an example. In the present invention, as shown in FIG. 18, the object for effect 5 consisting of a three-dimensional model which contains the virtual camera (viewpoint) 2 and is provided between the viewpoint 2 and the object 1, and an effect image representing rain is displayed on a surface of the object for effect 5 on the virtual camera side (in this embodiment, an inner surface of a sphere). As shown in FIG. 18, for example, assuming that one point of the spherical object for effect 5 is a generation point of rain and the other point where a straight line passing the center of the sphere crosses the spherical surface is a disappearance point, the effect image of rain is drawn along respective curved lines on the spherical surface connecting the generation point and the disappearance point. The image processing means for moving rain drops is a general image processing means as described in the related background art. For example, a texture image of a drop of rain is moved to a predetermined direction by changing the texture image of rain drops in series (pattern changing), or by changing the mapping coordinate of the texture image of the rain drops in series. In the present embodiment, as shown in FIG. 18, the texture image of rain drops is moved on the surface of a spherical object for effect 5 (an object for applying effect image consisting of a three-dimensional model which contains a viewpoint of the virtual camera) instead of on the surface of a conventional plane object, so that a scene of rain falling down to a predetermined direction is represented. Then, impact V1, Va, V2, and V3 in a visual field area obtained by viewing the object 1 from a pertinent viewpoint 2 through the object for effect 5 are generated and displayed. More in detail, the three-dimensional coordinate of the texture image in the visual field area on the surface of the object for effect 5 is converted to the two-dimensional coordinate and the converted texture image V1, V2, and V3 is synthesized with a main image as an effect image. The above coordinate conversion processing (coordinate conversion processing by radioscopy conversions, etc.) is the same with the processing described in the related background art. The viewpoint 2 is controlled so as to move around the object 1 together with the object for effect 5 according to camerawork of the virtual camera 2. In that case, a direction of the effect displayed on the screen object for effect 5 is fixed regardless of a direction of the viewpoint, and the images V1, Va, V2, and V3 in FIG. 18 are displayed as shown in FIGS. 19A, 19B, 19C, and 19D, respectively. According to the above effect processing, the direction of rain has the natural directionality even if the direction of camera is changed so that the conventional problem as described in the related background art that the direction of rain seems unnatural does not arise even if an object (a moving object moving to a predetermined direction) has the directionality like rain.

Figure 20:
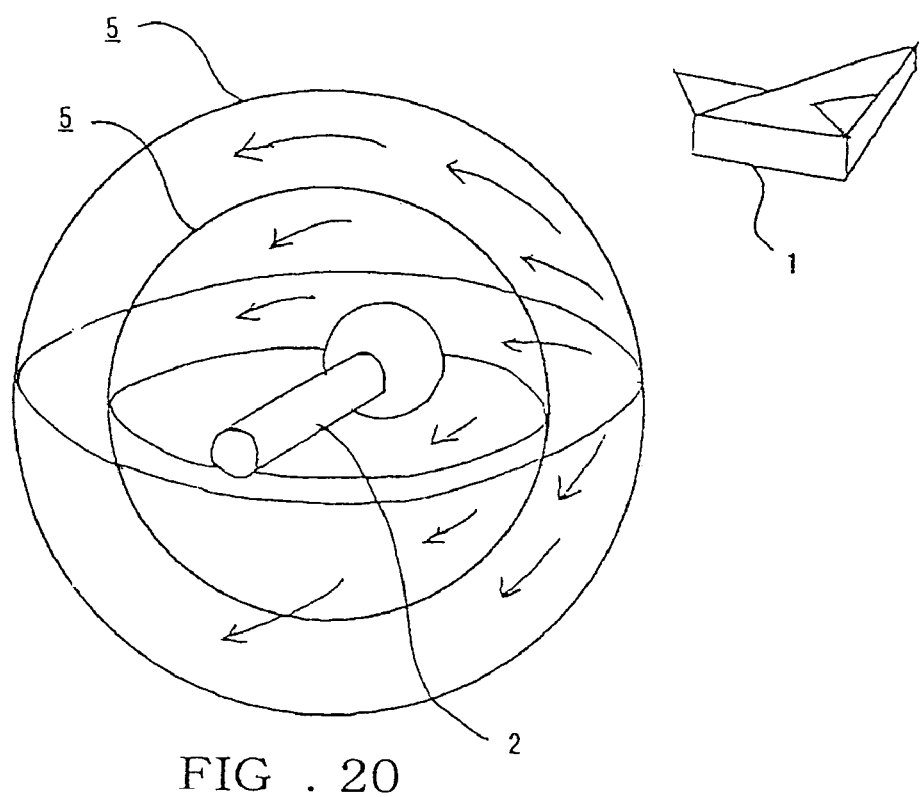
FIG. 20 is a schematic diagram for explaining a first embodiment in the case in which a multiplex object for effect in accordance with the present invention is used.
Figure 21:
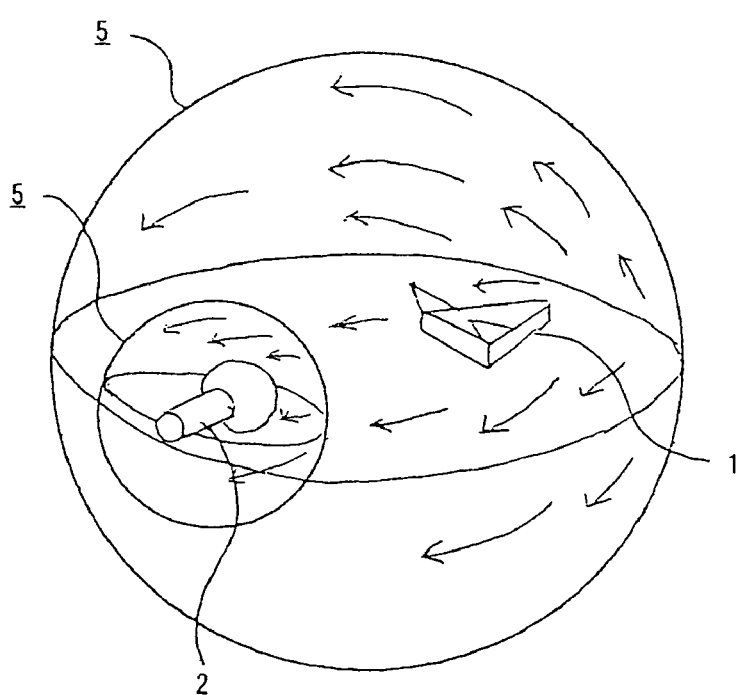
FIG. 21 is a schematic view of explaining a second embodiment in the case in which the multiplex object for effect in accordance with the present invention is used.

FIG. 20 shows an example in the case in which a plurality of objects for effect 5 are disposed so as to be layered and effect display is performed multiply. Such a plurality of objects for effect 5 forming a layered object is used, whereby an effect image having increased depth perception can be displayed. In addition, on the plurality of objects for effect 5, effects in which any one of an image, a direction, a color, and a speed of a displayed effect is different are displayed, a great variety of effects can be displayed, which is more effective. In addition, as shown in FIG. 21, a second object for effect 5 containing the object 1 may be arranged other than a first object for effect 5 between the viewpoint 2 and the object 1. That is, the object for effect 5 may be arranged such that a surface of an object also exists on the opposite side of the viewpoint 2 across the object 1. In this case, the objects for effect 5 may be arranged in positions where a surface of an object on the outer side does not interfere with an object or the like in the background.

Figure 22:
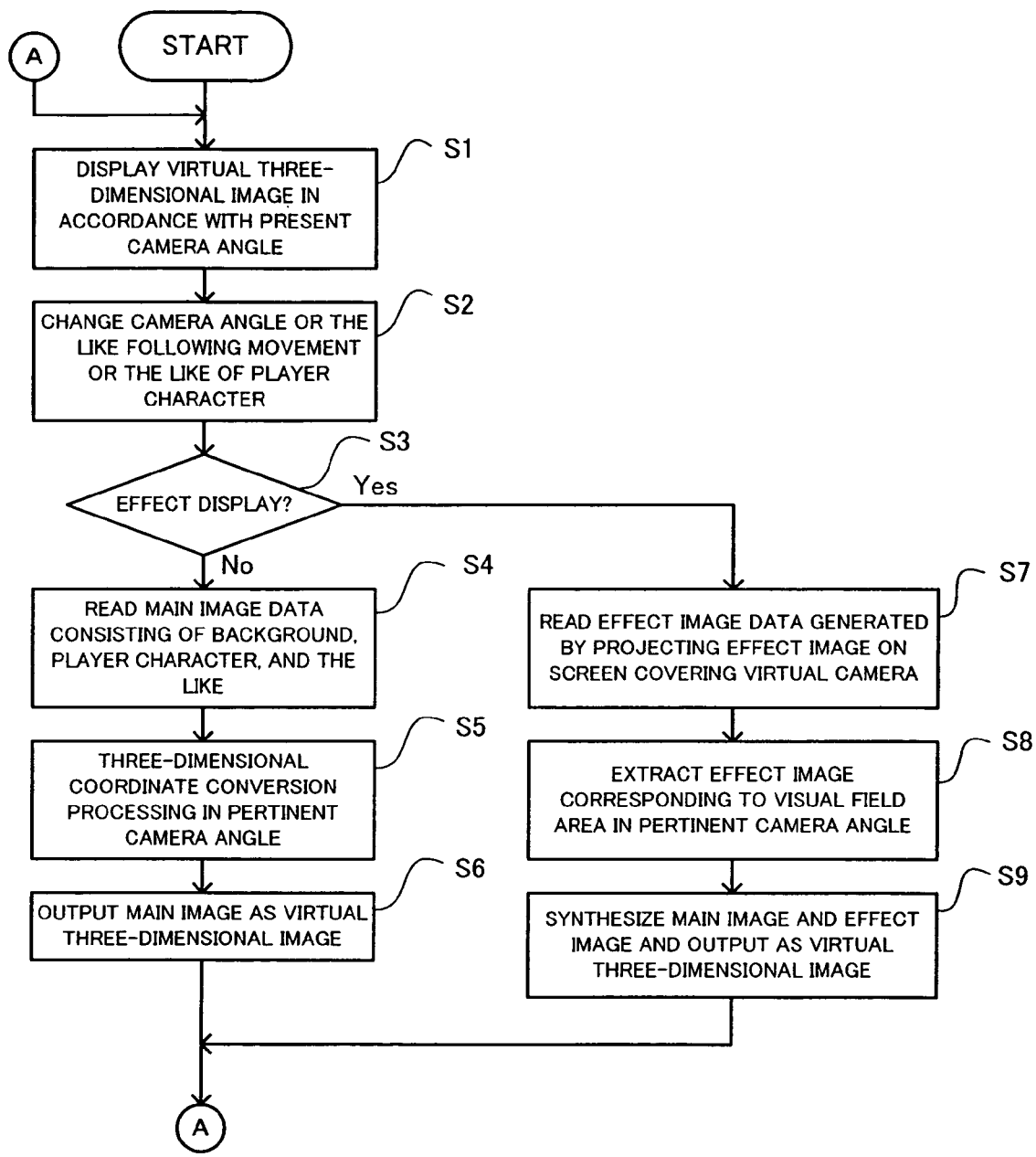
FIG. 22 is a flowchart for explaining an example of operations of a game apparatus in accordance with the effect processing in the present invention.

Next, an example of operations of a game apparatus in accordance with the effect processing of the present invention will be described in accordance with a flowchart of FIG. 22.

The game apparatus reads camerawork control data (present contents of various parameters relating to camerawork of a virtual camera) from the work memory 161 and displays a virtual three-dimensional image on the display unit 30 in accordance with a present camera angle (step S1). A player performs an operation for moving a player character or an operation for changing a visual field direction of a player character from the input unit 20 while looking at the image displayed on the display unit 4. In the game control means 110, the game apparatus finds a character position and direction in a three-dimensional space after the operation based upon information on the operation from the input unit 20 and present character position and direction data and updates contents of a pertinent parameter relating to camerawork in order to change a position, a camera angle, or the like of the virtual camera following movement or the like of the player character (step S2).

Then, the game apparatus judges whether or not to perform effect display with a position of the player character, a position and an image pickup direction of the virtual camera, a present scene, and the like as elements (step S3). If the effect display is not to be performed, the game apparatus reads main image data consisting of a background, the player character, and the like from the data memory 162 (step S4), performs three-dimensional coordinate conversion processing in a pertinent camera angle with the display screen generation means 150 (step S5), outputs a virtual three-dimensional image of the main image, to which drawing processing or the like is applied, and displays it on the display unit 30, and shifts to step S1 to repeat the effect processing (step S6).

On the other hand, if it is judged in step S3 that the effect display is to be performed, the game apparatus reads effect image data generated by projecting an image on the object consisting of the three-dimensional model covering the virtual camera 2 (step S7), and extracts an effect image corresponding to a visual field area in a pertinent camera angle (step S8). Then, the game apparatus synthesizes the main image and the effect image to output a synthesized image, displays a virtual three-dimensional image, to which the effect processing is applied, on the display unit 30 (step S9), and shifts to step S1 to repeat the effect processing. Note that an effect displayed using an object for effect is a moving image in this embodiment, a moving image to which the effect processing is applied is displayed on the display unit 30 even in a state in which movement of the player character or the virtual camera does not change.

Note that, although the case in which a three-dimensional model (object) for effect is constituted by a polygon is described as an example in the above-mentioned embodiment, the three-dimensional model may be constituted by other technique such as a technique using a lattice (lattice box) or a technique using a curved surface of an NURBS (non-uniform rational B-spline) form. In addition, although the above-mentioned embodiment is described with the computer game as an example, the present invention is not limited to this but can be applied to any image processing as long as the image processing applies an effect around a displayed object. In addition, although an object in a virtual three-dimensional space to be an object of the effect processing is described with a moving body (moving image), which moves according to an operation of an operator or computer control, as an example, the present invention can be applied to a stationary object (still image).

As described above, according to the present invention, a natural effect can be displayed in any direction of 360 degrees within a virtual three-dimensional space. In addition, an effect such as rain or wind can be displayed naturally without using special hardware or technique. Moreover, compared with the conventional technique for arranging a plate into plane object on which an effect image is applied to display the effect image, load of the effect processing is light even in the case in which an effect image of various natural objects is displayed or an effect processing for increasing a video an image effect with an artificial view such as feeling of air is applied. Thus, it becomes possible to display the effect image without the occurrence of deficiency even with an inexpensive apparatus.

What is claimed is:

1. An effect image processing method in a virtual three-dimensional space for representing moving objects displayed around a character when said character is viewed from a predetermined viewpoint in the virtual three-dimensional space, comprising the steps of:

generating a main image including said character and a background image included in a visual field area viewed from the viewpoint of a virtual camera located in said virtual three-dimensional space;

providing a spherical object at a position, the spherical object consisting of a three-dimensional model including the viewpoint of said virtual camera and applying a texture image of said moving objects on said spherical object functioning as a screen on which an effective image is applied;

moving said texture image to a predetermined direction on said spherical object;

generating a synthesized image of an effect image and said main image by changing said texture image to said effect image by converting a three-dimensional coordinate of said texture image to a two-dimensional coordinate in the visual field area on said spherical object viewed from the viewpoint of said virtual camera; and performing a moving process of the position of said spherical object according to movement of said virtual camera wherein the predetermined direction of said spherical object is invariable regardless of transition in a direction of said virtual camera.

2. An effect image processing method according to claim 1, further comprising a step of controlling the viewpoint of said virtual camera such that the viewpoint moves around said character together with said spherical object.

3. An effect image processing method according to claim 1, wherein said spherical object is a spherical object consisting of polygons including all visual field areas from the viewpoint of said virtual camera.

4. An effect image processing method according to claim 1, wherein said spherical object is provided in a plural form and the plurality of spherical objects are disposed so as to form stratified spherical objects.

5. An effect image processing method according to claim 4, wherein, in said step of performing the applying process of said texture image, said texture image in which any one of a display content, a direction, a color, and a speed of said moving objects is different is applied on each of the plural spherical objects.

6. An effect image processing method according to claim 1, further comprising a step of controlling at least one of said character, the viewpoint of said virtual camera, and a direction of the view so as to move according to an operational input of an operator.

7. An effective image processing method according to claim 1, further comprising a step of changing the shape and/or size of said spherical object moving according to the move of said virtual camera by the coordinate conversion of said spherical object or by the change of said spherical object to another spherical object.

8. An effect image processing method according to claim 1, wherein the transition in said direction of said virtual camera includes rotation of said said virtual camera as said virtual camera moves along a path in said virtual three-dimensional space.

9. A computer program embodied in a computer readable medium for processing an effect image representing moving objects displayed around a character when said character is viewed from a predetermined viewpoint in a virtual three-dimensional space, performing the steps of:

generating a main image including said character and a background image included in a visual field area viewed from the viewpoint of a virtual camera located in said virtual three-dimensional space;

proving a spherical object at a position, the spherical object consisting of a three-dimensional model including the viewpoint of said virtual camera and applying a texture image of said moving objects on said spherical object functioning as a screen on which an effective image is applied;

moving said texture image to a predetermined direction on said spherical object;

generating a synthesized image of an effect image and said main image by changing said texture image to said effect image by converting a three-dimensional coordinate of said texture image to a two-dimensional coordinate in the visual field area on said spherical object viewed from the viewpoint of said virtual camera; and performing a moving process of the position of said spherical object according to movement of said virtual camera wherein the predetermined direction of said spherical object is invariable regardless of transition in a direction of said virtual camera.

10. A computer program embodied a in computer readable medium according to claim 9, further comprising a step for controlling the viewpoint of said virtual camera so as to move around said character together with said spherical object.

11. A computer program embodied in a computer readable medium according to claim 9, further comprising a step for controlling at least any one of said character, the viewpoint of said virtual camera, and a direction of the view so as to move according to an operational input of an operator.

12. A computer program embodied in a computer readable medium according to claim 9, further comprising a step of changing the shape and/or size of said spherical object moving according to the move of said virtual camera by the coordinate conversion of said spherical object or by the change of said spherical object to another spherical object.

13. A computer program embodied in a computer readable medium according to claim 9, wherein the transition in said direction of said virtual camera includes rotation of said said virtual camera as said virtual camera moves along a path in said virtual three-dimensional space.

14. An effective image processing apparatus for representing moving objects displayed around a character when said character is viewed from a predetermined viewpoint in the virtual three-dimensional space, the image processing apparatus comprising:

means for generating a main image including said character and a background image included in a visual field area viewed from the viewpoint of a virtual camera located in said virtual three-dimensional space;

means for providing a spherical object at a position, the spherical object consisting of a three-dimensional model including the viewpoint of said virtual camera and applying a texture image of said moving objects on said spherical object functioning as a screen on which an effective image is applied;

means for moving said texture image to a predetermined direction on said spherical object;

means for generating a synthesized image of an effect image and said main image by changing said texture image to said effect image by converting a three-dimensional coordinate of said texture image to a two-dimensional coordinate in the visual field area on said spherical object viewed from the viewpoint of said virtual camera; and means for performing a moving process of the position of said spherical object according to movement of said virtual camera wherein the predetermined direction of said spherical object is invariable regardless of transition in a direction of said virtual camera.

15. An effect image processing apparatus according to claim 14, further comprising viewpoint control means which controls the viewpoint such that the viewpoint moves around said character together with said spherical object.

16. An effect image processing apparatus according to claim 14,
wherein said spherical object is a spherical object consisting of polygons including all visual field areas from the viewpoint of said virtual camera.

17. An effect image processing apparatus according to claim 14,
wherein said spherical object is provided in a plural form and the plurality of spherical objects are disposed so as to form stratified spherical objects.

18. An effect image processing apparatus according to claim 17,
wherein, in said means for applying said texture image, said texture image in which any one of a display content, a direction, a color, and a speed of said moving objects is different is applied on each of said spherical objects.

19. An effect image processing apparatus according to claim 14, further comprising movement control means which controls at least one of said character, the viewpoint of said virtual camera, and a direction of the view so as to move according to an operational input of an operator.

20. An effect image processing apparatus according to claim 14, further comprising a means of changing the shape and/or size of said spherical object moving according to the move of said virtual camera by the coordinate conversion of said spherical object or by the change of said spherical object to another spherical object.

21. An effect image processing apparatus according to claim 14, wherein the transition in said direction of said virtual camera includes rotation of said said virtual camera as said virtual camera moves along a path in said virtual three-dimensional space.

* * * * *